Figure 1:
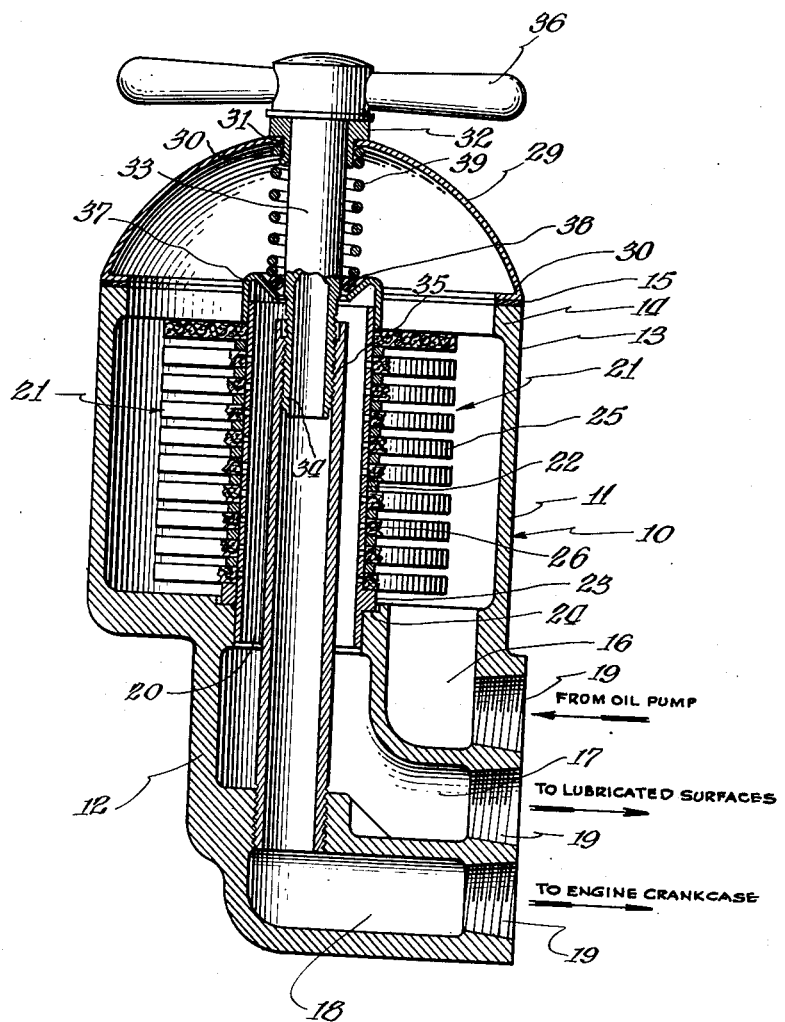

June 8, 1954

G. R. BEARDSLEY

OIL FILTER 2,680,520

Filed Feb. 1, 1951

2 Sheets-Sheet 1

Inventor:
Gale R. Beardsley
By: Paul O. Pippel
Attorney.

June 8, 1954

G. R. BEARDSLEY 2,680,520

OIL FILTER

Filed Feb. 1, 1951

2 Sheets-Sheet 2

Inventor:
Gale R. Beardsley
By: Paul O. Pippel
Attorney.

Patented June 8, 1954

2,680,520

UNITED STATES PATENT OFFICE 2,680,520

OIL FILTER

Gale R. Beardsley, Fort Wayne, Ind., assignor to International Harvester Company, a corporation of New Jersey Application February 1, 1951, Serial No. 208,901

6 Claims. (Cl. 210—164)

This invention relates to internal combustion engines and more particularly to a new and improved lubricating oil filter attachment for use with the lubricating oil system of internal combustion engines.

It is common practice in the operation of internal combustion engines to provide some means for continually cleaning the lubricating oil being circulated therethrough to obtain long periods of trouble-free operation. Two principal methods have been developed for filtering the oil; namely, the so called "full flow" method and the "partial flow" method. Each method has certain advantages over the other method and it becomes incumbent for the engine operator to choose one of the methods for incorporation in his installation. Obviously, by choosing one method over the other the operator sacrifices the desirable features of the method not chosen.

The "full flow" method, as its name implies, contemplates the continuous circulation of lubricant from a reservoir such as the engine crank case to an oil pump where substantially all the oil received by the pump is forced under pressure directly through a filter unit having a relatively high oil permeability. The filtered oil is then directed to the engine bearings and other surfaces requiring lubrication and finally back to the engine crank case. Inasmuch as the filter unit has a high oil permeability only the larger of the solids or impurities which are injurious to the bearings are filtered from the oil. In the "partial flow" method only a portion of the oil under pressure delivered by the oil pump actually passes through the filter unit since the filter media has a rather low oil permeability. The latter method is employed where it is desirable to not only strain the oil and remove the larger particles of impurities but also to remove the impalpable solids, like colloidal carbon, and acids, known to discolor the oil, from the oil. It will be obvious that the "partial flow" filter unit, while capable of cleaning the oil which passes through it to a higher degree than the "full flow" filter unit, is not practical to use in a "full flow" system because of the huge filter unit that would be needed to accommodate all the oil delivered by the pump. It is, therefore, the primary objective of the present invention to provide a filter unit attachment applicable to a filter unit of the "full flow" type whereby the desirable features of both the "full flow" and "partial flow" systems are obtained without their inherent disadvantages.

Another object is to provide an auxiliary filter unit which is quickly and easily attached to a modified "full flow" filter unit.

A further object is the provision of novel restricting means for directing a predetermined proportion of the oil introduced into the modified "full flow" filter unit to the filter unit attachment.

Still another object is the provision of unique attachment structure for assembling the auxiliary filter unit on the modified "full flow" unit.

Figure 2:
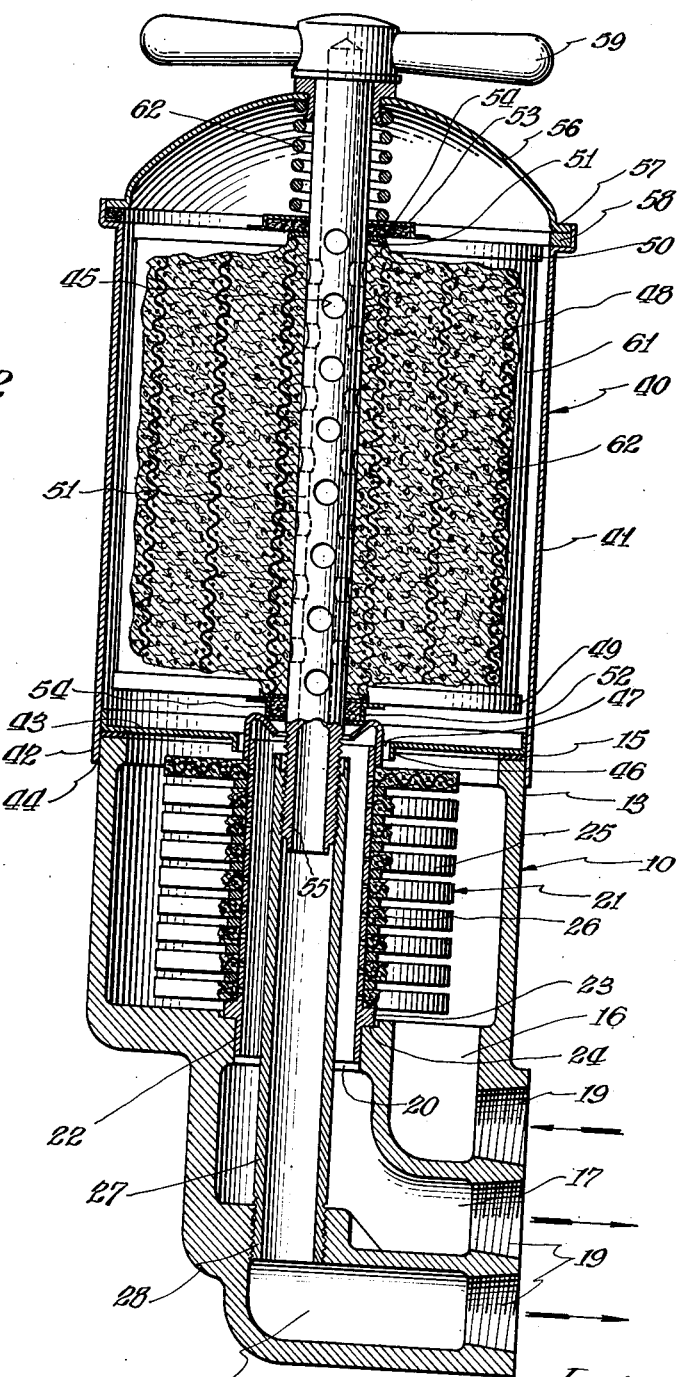

The foregoing and other important objects and desirable features inherent in and encompassed by the invention, together with many of the purposes and uses thereof, will become readily apparent from a reading of the ensuing description in conjunction with the annexed drawings, in which, Fig. 1 is a longitudinal sectional view of a "full flow" filter unit before the application of the auxiliary filter unit attachment thereon; and Fig. 2 is a view similar to Fig. 1 showing the auxiliary filter unit attachment mounted on the "full flow" filter unit.

Referring to the drawings in detail wherein like reference characters represent like elements throughout the various views there is shown an oil filter unit 10 adapted to be mounted upon an internal combustion engine (not shown). The filter unit 10 includes a cylindrical body section 11 closed at one end by an integrally formed end section 12. The upper portion 13 of the body section 11 opposite the end section 12, as best shown in Fig. 1, has an inwardly projecting peripheral flange 14 formed thereon to provide a seating surface for receiving a circular gasket 15, the purpose of which will be explained hereinafter.

The end section 12 has three longitudinally spaced cored oil passages 16, 17, 18 formed therein. The uppermost passage 16, as viewed in Fig. 1, opens into the interior of the body section 11. Each passage 16, 17, 18 has a threaded pipe connection 19. A lubricating oil pump (not shown) is adapted to deliver oil under pressure, in the direction of the arrow shown in Fig. 1, to the inlet passage 16 by way of a passage (not shown) which interconnects the pressure side of the pump and the threaded connection 19 associated with the inlet passage.

The intermediate passage 17 has a central opening 20 disposed along the longitudinal axis of the filter unit 10. A pipe or passage (not shown) is secured to the pipe connection 19 associated with the intermediate passage 17 and leads to conventional piping for directing the filtered oil to the surfaces requiring lubrication.

The filter medium, designated generally by numeral 21, includes a tubular member 22 having one end insertable into the opening 20. An integrally formed, radial flange 23 abuts a recessed annular surface 24 encircling the opening 20 to position the tubular member 22 within the body section 11. A plurality of hollow disk-like filtering elements 25 are spaced along the tubular member 22 and are suitably secured thereto. Each disk-like element 25 is formed of screen material; the mesh size being sufficient to filter by straining the oil of relatively coarse particles without excessive, damaging pressure values being experienced within the body section 11. Perforations or apertures 26, provided along the length of the tubular member 22, establish fluid communication between the interior of each filter element 25 and the tubular member 22.

It will be readily seen that oil under pressure enters the inlet passage 16 and is directed to the interior of the body section 11 to fill the same. The oil then passes through the screen disk-like elements 25 to the interior of the tubular member 22 through the apertures 26. The filtered oil then is directed to the intermediate passage 17 and thence to the lubricated surfaces. The oil eventually returns to an oil reservoir (not shown) such as the engine crank case. It is to be understood that the mesh size of the filter elements 25 is to be small enough to obstruct the passage of dirt, foreign matter, and metallic particles of relatively large size which impair the lubricating properties of the oil but not so small as to prevent a substantially free flow of oil through the filter unit. It will also be appreciated that the particular "full flow" filter unit structure described is conventional in every respect with the exception of the provision of cored oil passage 18, the purposes of which will be explained hereinafter.

Concentric with and being disposed within the perforated tubular member 22 is an imperforate tubular member 27 which is supported by the end section 12. The lower end 28 of the member 27 extends into the lowermost passage 18. An inverted cup-shaped cover 29, having its outer peripheral edge 30 turned inwardly, is adapted to abut the gasket 15 to enclose the body section 11. The center of the cover has an aperture 31 fitted with an oil seal bushing 32 through which a spindle 33 extends. The lower end of the spindle 33 is provided with threads 34 for engaging corresponding internal threads 35 formed in the tubular member 27. A handle 36 fastened to the spindle 33 exteriorly of the cover 29 is provided for screwing the spindle into the tubular member 27 to secure the cover to the body section 11. In order to prevent seepage of oil from the interior of the body section 11 to the tubular member 22 without first passing through the filter elements 25 a seal is provided between the spindle 33 and the tubular member 22. The upper end of the tubular member 22 has a cap 37 secured thereto. The center of the cap 37 is depressed forming an inverted conical pocket for receiving a rubber sealing ring 38 which is wedged between the cap 37 and the spindle 33. A coil spring 39 encircling the spindle 33 having one end abutting the ring 38 and its other end contacting the cover 29 maintains the ring within the annular pocket and further prevents the filter medium 21 from being displaced.

As stated hereinbefore, while a "full flow" type filter unit removes solid matter of a size sufficient to injure the bearings it is oftentimes desirable to strain out the colloidal solids and to preserve the color of the oil without the need of making costly alterations to the oil cleaning system.

The present invention contemplates the application of a compact, inexpensive auxiliary filter unit attachment to a modified "full flow" filter unit of the type described above in order to remove the impalpable impurities and metal damaging acids from the oil and still not sacrifice the beneficial filtering characteristics of a conventional "full flow" filter unit.

The auxiliary filter unit attachment, designated generally by numeral 40, includes a cylindrical shell 41 having an inside diameter substantially the same as the outside diameter of the body section 11 of the modified "full flow" filter unit 10. In order to modify the "full flow" filter unit 10 to function concurrently as a filtering system so it functions as well, the cover 29 together with the spindle 33 are removed from the filter unit 10. A lower portion 42 of the shell 41 is telescoped over the upper portion 13 of the body section 11. A circular plate 43, spaced from the lower edge 44 of the shell 41, is rigidly secured to the shell 41 and is adapted to abut the gasket 15. The plate 43 is provided with a centrally disposed aperture which is defined by a circular, depending flange 46 integrally formed with the plate. The flange 46 is radially spaced from the cap 37 in order to provide an annular passage 47 for the flow of oil from the filter unit 10 to the auxiliary filter unit attachment 40.

The filter medium 48 employed in the filter unit attachment 40 includes a pair of longitudinally spaced end flanges 49, 50 and a tubular spindle 51 having perforations or apertures 45 disposed along the length thereof. Attached to each end flange 49, 50 is an annular seal retainer 52, 53 for supporting rings 54 of sealing material such as felt or the like. The tubular spindle 51 is adapted to extend through the end flanges 49, 50 and the rings 54 and have its lower end 55 engageable with the internal threads 35 formed in the tubular member 27. The spindle 51 extends upwardly beyond the top flange 56 through a cover 56. The cover 56 has a peripheral flange 57 adapted to abut a sealing gasket 58 supported upon a radial shoulder integrally formed with the shell 41. The outer end of the spindle 51 is provided with a handle 59 for screwing the spindle 51 into the tubular member 27 and thus securely mount the auxiliary filter unit 40 on the filter unit 10.

The "partial flow" filter element 60 includes a relatively fine mesh screen 61 coated with a layer 62 comprising fibrous material or like substances. The screen 61 is spiraled about the spindle 51 to form superimposed layers of filtering media and is fastened to the end flanges 49 and 50 by any suitable means. The lower seal retainer 52 abuts the inclined surface of the cap 37 and prevents oil from entering the tubular member 22 from the shell 41. A coil spring 62, compressed between the upper seal retainer 53 and the cover 56, maintains the lower seal retainer 52 tightly against the cap 37. While a particular type of "partial flow" filter medium has been described, it is to be understood that the invention is not limited to the employment of that specific filter medium.

From the foregoing description, it will be appreciated that in order to incorporate the auxiliary filter unit attachment 40 into the oil system and to thus convert what is normally a "full flow" oil filtration system to a modified system having the advantages of both the "full flow" and "partial flow" systems without the necessity of costly alterations, the following steps are taken Handle 36 is turned in a direction to unscrew spindle 33 from tubular member 27. The cover 29 and spindle 33 are then removed from the body section 11. Thereafter, the auxiliary filter unit attachment 40 is mounted on the body section 11 as shown in Fig. 2. Oil enters inlet passage 16 and is directed to the body section 11. A predetermined amount of the oil entering the body section 11 flows through the annular passage 47 into the shell 41. The amount flowing into the shell is dependent upon the area of the annular passage 47 which may be varied in any particular installation to obtain the desired proportioning of oil flow. The oil which enters the shell 41 seeps through the "partial flow" filter medium 49 in a transverse direction until it flows through apertures 45. The filtered oil then flows downwardly through tubular spindle 51 and tubular member 27 to outlet passage 18. A pipe (not shown) interconnects passage 18 with the oil reservoir or engine crank case. The oil which is restricted from entering the shell 41 is filtered through the "full flow" filter elements 25 and enters tubular member 22 where it is directed to the outlet passage 17. As stated hereinbefore, the oil from passage 17 flows to the lubricated surfaces and eventually returns to the oil reservoir.

The embodiment of the invention chosen for the purposes of illustration and description herein is that preferred for achieving the objects of the invention and developing the utility thereof in the most desirable manner, due regard being had to existing factors of economy, production methods, simplicity of design and construction, and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed is:

1. A filter unit attachment for a filter unit of the type having a casing containing a first filtering element, inlet means for introducing fluid to said casing, and outlet means for receiving fluid from said first filtering element comprising, a housing having an auxiliary filtering element disposed therein; attachment means for mounting said housing on the end of said casing opposite said inlet means, said housing being capable of receiving fluid from said casing when mounted thereon; and outlet means for receiving fluid from said auxiliary filtering element, said outlet means including a portion of said attachment means and being independent of the outlet means for receiving fluid from said first filtering element.

2. A filtering unit attachment as set forth in claim 1 in which, restricting means are provided for directing a predetermined proportion of the fluid introduced into said casing to said housing.

3. A filter unit attachment for a filter unit of the type having a casing provided with an inlet, first and second outlet openings at one end thereof, a filtering element contained within said casing for receiving fluid from said inlet opening, and first conduit means for receiving fluid from said filtering element and directing the same to said first outlet opening comprising, a housing having an auxiliary filtering element disposed therein; attachment means for fastening one end of said housing to the end of said casing opposite said inlet and outlet openings, said housing being capable of receiving fluid from said casing when fastened thereto; and auxiliary conduit means including a section of said attachment means for receiving fluid from said auxiliary filtering element and directing the same to said second outlet opening, said auxiliary conduit means extending through and being coaxial with said said first conduit means.

4. A filter unit attachment as set forth in claim 3 in which, said housing is provided with restricting means for directing a predetermined proportion of the fluid introduced into said casing to said housing, said means comprising an inwardly extending flange having its outer marginal edge secured to said housing adjacent the juncture of the casing and housing and its inner marginal edge spaced from said first conduit means.

5. A filter unit attachment for a filter unit of the type having a cylindrical casing provided with an inlet, first and second outlet openings at one end thereof, a filtering element contained within said casing for receiving fluid from said inlet opening, and a centrally disposed perforated tubular member within said casing for receiving fluid from said filtering element and directing the same to said first outlet opening comprising, a cylindrical housing having an auxiliary filtering element disposed therein, said housing having an attachment end adapted to encircle the end of said casing opposite said inlet and outlet openings and receive fluid from said casing; centrally disposed attachment means for detachably connecting said housing to said casing, said means including a perforated tubular member for receiving fluid from said auxiliary filtering element, said tubular member further having a threaded end portion; an auxiliary tubular member extending through and being coaxial with the tubular member within said casing, said auxiliary tubular member having one end communicating with said second outlet opening and its opposite end provided with a threaded portion engageable with the threaded end portion of said perforated tubular member whereby fluid communication is established between said auxiliary filtering element and said second outlet opening.

6. A filter unit attachment as set forth in claim 5 in which, said housing is provided with restricting means for directing a predetermined proportion of the fluid introduced into said casing to said housing, said means comprising an inwardly extending flange having its outer marginal edge secured to said housing adjacent the juncture of the casing and housing and its inner marginal edge spaced from said tubular member disposed within said casing.

References Cited in the file of this patent

UNITED STATES PATENTS

| Number | Name | Date |
| --- | --- | --- |
| 1,906,417 | Renfrew et al. | May 2, 1933 |
| 1,941,311 | McLean | Dec. 26, 1933 |
| 2,076,935 | Burckhalter | Apr. 13, 1937 |
| 2,271,054 | Williams | Jan. 27, 1942 |
| 2,313,307 | Wilkinson | Mar. 9, 1943 |